United States Patent [19]
Kaiser et al.

[11] Patent Number: 5,978,938
[45] Date of Patent: Nov. 2, 1999

[54] FAULT ISOLATION FEATURE FOR AN I/O OR SYSTEM BUS

[75] Inventors: John M. Kaiser; Warren E. Maule, both of Cedar Park, Tex.

[73] Assignee: International Business Machines Corporation, Armonk, N.Y.

[21] Appl. No.: 08/752,079

[22] Filed: Nov. 19, 1996

[51] Int. Cl.[6] .................................................... G06F 11/00
[52] U.S. Cl. ............................................... 714/48; 714/56
[58] Field of Search ............................. 395/185.01, 185.09

[56] References Cited

U.S. PATENT DOCUMENTS

| | | | |
|---|---|---|---|
| 4,279,034 | 7/1981 | Baxter | 371/8 |
| 4,785,453 | 11/1988 | Chandran et al. | 371/68 |
| 4,996,688 | 2/1991 | Byers et al. | 371/16.5 |
| 5,249,187 | 9/1993 | Bruckert et al. | 371/68.1 |
| 5,271,020 | 12/1993 | Marisetty | 371/30 |
| 5,313,476 | 5/1994 | Haberkorn, Jr. et al. | 371/61 |
| 5,448,725 | 9/1995 | Gervais | 395/184.01 |
| 5,627,965 | 5/1997 | Liddell et al. | 395/185.09 |

FOREIGN PATENT DOCUMENTS

| | | | |
|---|---|---|---|
| 08022423 | 1/1996 | Japan | G06F 13/00 |

OTHER PUBLICATIONS

Aichelman, Jr., IBM Technical Disclosure Bulletin, vol. 30 No. 8. pp. 324–326 (Jan. 1988).
Berglund et al, IBM Technical Disclosure Bulletin, vol. 32 No. 6A, pp. 153–163 (Nov. 1989).
Bland et al, IBM Technical Disclosure Bulletin, vol. 32 No. 10A, pp. 184–186 (Mar. 1990).
Pita et al, IBM Technical Disclosure Bulletin, vol. 37 No. 02B, pp. 59–63 (Feb. 1994).

*Primary Examiner*—Ly V. Hua
*Attorney, Agent, or Firm*—Richard A. Henkler; Daniel E. Venglarik; Andrew J. Dillon

[57] ABSTRACT

In a data processing system including a bus connected to a plurality of devices capable of driving said bus, error reporting and isolation is achieved by signaling a self-check to each device connected to the bus to determine if it was driving the bus at the time an error occurred. The bus check request is generated by one of the devices connected to the bus in response to detecting either a parity error or an internal error. If a parity error is detected, a bus check request is signaled to a combining unit connected to the bus. The combining unit signals the self-check to each of the devices attached to the bus in response to receiving the bus check request. Each device determines whether it was driving the bus at the time the error occurred and, if so, sets a source of error indicator on the device. Similarly, if an internal error is detected, the detecting device sets source of error and internal error indicators on the detecting device and signals a bus check request to the combining unit. The source of error and internal error indicators are accessible to a machine check or service processor mechanism in the data processing system.

20 Claims, 4 Drawing Sheets

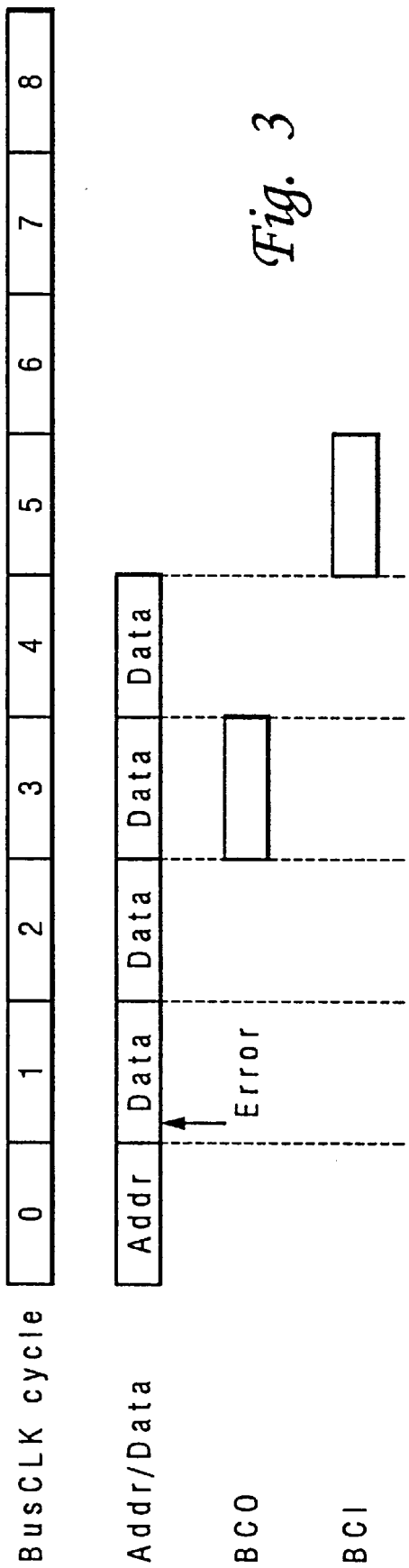

FAULT ISOLATION FEATURE FOR AN I/O OR SYSTEM BUS

BACKGROUND OF THE INVENTION

1. Technical Field

The present invention relates in general to error reporting and fault isolation in a system or I/O bus and in particular to error reporting and fault isolation in a bidirectional or multi-drop bus. Still more particularly, the present invention relates to a method of reporting and handling parity errors or internal errors in a bidirectional bus in a manner which isolates the source of the error for a machine check mechanism.

2. Description of the Related Art

Errors on system and I/O buses within a data processing system are unavoidable. Such errors may be attributable to a variety of reasons, including failure of a driving circuit to assert a particular bus conductor, internal errors such as a timeout within a device connected to the bus, or conflicting attempts by bus devices to drive or master the bus. These errors occur regardless of whether the bus is multiplexed or includes separate address and data lines.

Various mechanisms have been developed for detecting and/or isolating bus errors or fault conditions, ranging from simple parity checking to dedicated monitoring mechanisms. Detection and isolation of bus errors is essential to recovery from the fault condition or for generating status reports if user intervention is required to correct the fault condition. Error detection and isolation in modern data processing systems is becoming increasingly difficult due to the use of multi-level bus hierarchies, high speed local buses, bidirectional or multi-drop buses, multiplexed buses, and complex bus protocols.

Bidirectional or multi-drop buses, those which can be driven by multiple sources, are by nature subject to various phenomena such as crosstalk, signal reflection, parity errors, etc. Because the bus includes multiple sources, error isolation is difficult. Depending on the nature of the error and manner in which it manifests itself, isolation of the source of a fault condition in a bidirectional bus may be impossible without some mechanism for monitoring the source of errors or events surrounding the occurrence of errors. Complicated error reporting, fault isolation, or fault capture mechanisms increase the cost and complexity of a data processing system and may introduce undesirable latency or delays.

If bidirectional buses are multiplexed to use the same bus conductors for both address and data transmission, or subject to stringent transmission protocols and signaling requirements, isolation of fault conditions may be further complicated. On some such bidirectional buses, such as SCSI and PCI buses, arbitration phases are implemented requiring a device to win control of the bus before initiating a data transaction. Such protocols purportedly eliminate errors due to conflicts among multiple devices, but in reality are not flawless.

It would be desirable, therefore, to provide bidirectional buses, where multiple devices connected to the bus may be the source of an error, with a mechanism for error reporting and fault isolation. Such a mechanism should be simple and introduce a nominal latency into the machine check mechanism of the data processing system.

It would further be desirable if errors could be isolated in regards to source, to a specific device connected to the bus, and if some indication as to the reason for the error could be provided. A method for capturing errors in such a manner should be easily adaptable for use in either a system or I/O bus, as well as in multiplexed buses or buses with separate address/data lines. Such an error reporting and isolation mechanism would provide a valuable resource to the system machine check mechanism of a data processing system for identifying the cause of errors for system recovery or for system status reports.

SUMMARY OF THE INVENTION

It is therefore one object of the present invention to provide improved error reporting and fault isolation in a system or I/O bus.

It is another object of the present invention to provide improved error reporting and fault isolation in a bidirectional or multi-drop bus.

It is yet another object of the present invention to a method of reporting and handling parity errors or internal errors on a bidirectional bus in a manner which isolates the source of the error for a machine check mechanism.

The foregoing objects are achieved as is now described. In a data processing system including a bus connected to a plurality of devices capable of driving said bus, error reporting and isolation is achieved by signaling a self-check to each device connected to the bus to determine if it was driving the bus at the time an error occurred. The bus check request is generated by one of the devices connected to the bus in response to detecting either a parity error or an internal error. If a parity error is detected, a bus check request is signaled to a combining unit connected to the bus. The combining unit signals the self-check to each of the devices attached to the bus in response to receiving the bus check request. Each device determines whether it was driving the bus at the time the error occurred and, if so, sets a source of error indicator on the device. Similarly, if an internal error is detected, the detecting device sets source of error and internal error indicators on the detecting device and signals a bus check request to the combining unit. The source of error and internal error indicators are accessible to a machine check or service processor mechanism in the data processing system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 depicts a timing diagram for error-related BCO and BCI signals in accordance with a preferred embodiment of the present invention.

DETAILED DESCRIPTION OF THE PREFERRED EMBODIMENT

Figure 1:
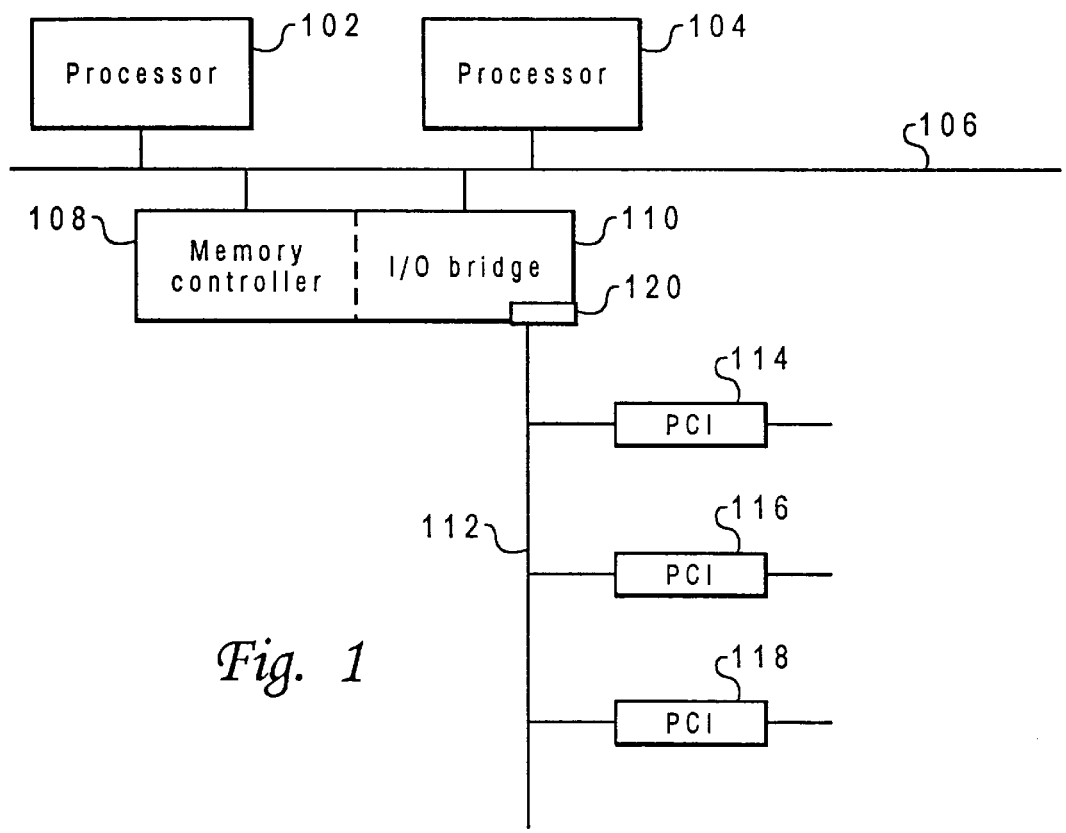
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. The data processing system may include multiple processors 102 and 104 attached to the primary system bus 106. System bus 106 is a multi-drop bus and may be driven by more than one device connected to system bus 106. Also connected to primary system bus 106 is a system memory controller 108, which preferably includes an integral I/O bridge 110. I/O bridge 110 may serve as the point at which a secondary bus 112 attaches to the primary system bus 106. Various devices or adapters 114, 116, and 118 may be attached to and participate on secondary bus 112. In the depicted example, I/O bridge 110 also includes combination logic 120 for implementing error reporting and fault isolation in accordance with a preferred embodiment of the present invention. Secondary bus 112 is thus the "governed" bus in the depicted example (i.e, the bus for which error reporting and fault isolation is being implemented). Those skilled in the art will recognize that the configuration depicted is merely exemplary of one environment in which the present invention may be implemented and that various changes and modifications may be made, or that the invention may be implemented for other buses such as system bus 106.

Figure 2:
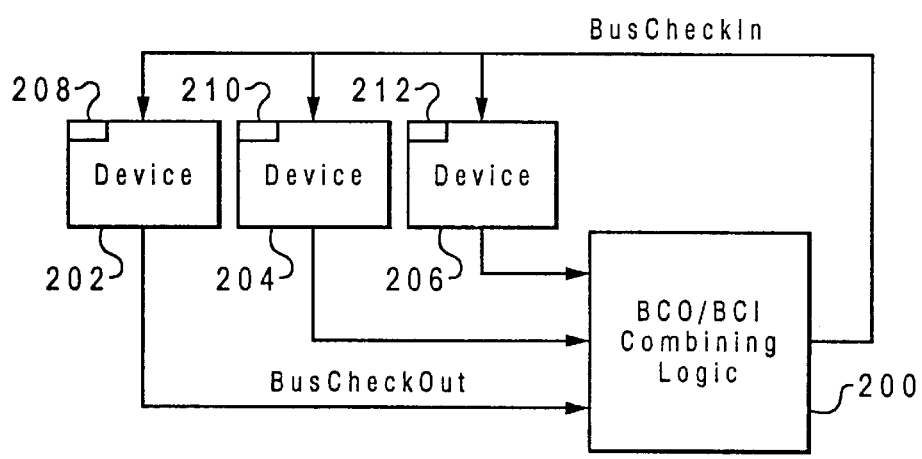
FIG. 2 is a block diagram of the combination logic and bus devices implementing the bus error reporting and fault isolation mechanism in accordance with a preferred embodiment of the present invention.

Referring to FIG. 2, a block diagram of the combination logic and bus devices implementing the bus error reporting and fault isolation mechanism in accordance with a preferred embodiment of the present invention is illustrated. The mechanism depicted may be implemented in any bus provided the hardware is equipped with facilities for supporting the functions described below. The present invention is thus best suited for implementation is data processing buses which are specifically designed to support the error reporting and fault isolation mechanism described.

Combination logic 200 receives error reporting signals from other devices 202, 204, and 206 attached to the governed bus and returns error signals to the same devices. Bus devices 202, 204, and 206 attached to the bus for which error isolation is implemented may be processors, adapters, or peripheral devices. One of the other bus participants 202, 204, and 206 may be a service processor.

Combination logic 200 receives error input signals which are connected point-to-point from each bus device 202, 204, and 206. These error input signals are sampled each bus cycle and are OR'd together to form a composite error signal, which is driven unidirectionally back to all bus devices. This is preferable to multi-dropping several devices on a common check signal since the error input signals can be examined every bus cycle, isolating the error condition to a single cycle. On a tristate conductor, a common signal could not be actively restored due to multiple potential drivers, and could not be inactively restored (pulled-up via resistor to $V_{cc}$) in one cycle at high bus speeds.

The error-related signals from bus devices 202, 204, and 206 which are sent to combination logic 200 are BusCheckOut (BCO) signals, which are sent via point-to-point conductors to combination logic 200. The error-related (composite) signal sent from combination logic 200 to bus devices 202, 204, and 206 are BusCheckIn (BCI) signals, generated by sampling the BCO signals each bus cycle and asserting the BCI signal two bus cycles later if any of the BCO signals were asserted. These two signals, BCO and BCI, support the bus error reporting and fault isolation functions and are capable of switching every bus cycle.

Each bus device 202, 204, and 206 includes a fault isolation register 208, 210, and 212, respectively. Fault isolation registers 208, 210, and 212 may be scanned by a service processor and/or read by a system processor responsible for handling machine check conditions. Alternatively, fault isolation registers 208, 210, and 212 may be made directly addressable by software machine check handlers.

Each bus device 202, 204, and 206 records into fault isolation registers 208, 210, and 212 whether the respective device was driving the bus at the time the error was detected and the nature of the error detected. Each bus device 202, 204, and 206 must support the minimum number of bits required for fault isolation in a scannable register. Fault isolation registers 208, 210, and 212 thus include n bits, which may be allocated in the following fashion:

| | |
|---|---|
| bit 0 | bus parity error; |
| bit 1 | source of error (SOE); |
| bit 2 | internal check; and |
| bits 3–n | reason for internal check, e.g. timeout. |

Use of bits 3–n to indicate the reason for an internal check is optional.

Error-related signals BCO and BCI and fault isolation registers 208, 210, and 212 are used to implement error reporting and fault isolation. Each slave device among bus devices 202, 204, and 206 checks parity on the data or address transmitted on the bus during the next clock cycle after it was received. If parity is incorrect, the device detecting the parity error asserts BCO to combination logic 200 for one clock period and sets bit 0 in its fault isolation register, indicating that a bus parity error was detected. Individual BCO signals received from bus devices 202, 204, and 206 are combined by combination logic 200 and returned as the BCI signal two clock cycles later, which is received by all bus participants. Both the BCO and BCI signals are pulsed (active for only one clock cycle) so that the error may be isolated to a single clock cycle.

All bus devices 202, 204, and 206 will receive a BCO signal from combination logic 200 two clock cycles after a BCO was asserted indicating a parity error. Each bus device 202, 204, and 206 then checks to determine if it was the master on the bus transfer occurring four clock cycles before. If one of bus devices 202, 204, and 206 was driving the bus four clock cycles earlier, when the parity error occurred, it sets bit 1, the source of error (SOE) bit, of its fault isolation register. It is possible for more than one bus device 202, 204, and 206 to set their source of error bit after receiving a BCO signal, a condition which the machine check mechanism must handle.

Bus devices 202, 204, and 206 may, anytime during operation, conduct an internal check. Bus device 202, 204, or 206 will set bits 1 and 2, the source of error and internal check bits, of its fault isolation register if it detects an internal error. The bus device 202, 204, or 206 which detects an internal error will also, simultaneously with setting bits 1 and 2 of its fault isolation register, signal a BCO for one cycle to report the error. In the absence of multiple errors, only one bus device will have its internal check bit set when the fault isolation registers are scanned by the machine check mechanism. Thus, while multiple devices may have the source of error bit set in their respective fault isolation registers, the bus device with its internal check bit set should be identified as the highest priority source of error.

After allowing bus devices 202, 204, and 206 time to determine if they were driving the bus when the error occurred, a machine check is signaled, either by combination logic 200, a service processor, or software. During the machine check, the contents of fault isolation registers 208, 210, and 212 may be read to determine the source of the error and, optionally, the reason for an internal check by one of bus devices 202, 204, and 206.

With reference now to FIG. 3, a timing diagram for error-related BCO and BCI signals in accordance with a preferred embodiment of the present invention is depicted. A parity error occurs in a data transmission during bus clock cycle ("BusCLK cycle") 1 in the depicted example. The parity error is detected by at least one slave device attached to the bus during the next bus cycle, bus clock cycle 2. The detecting device signals a BCO to the combination logic during bus clock cycle 3. Two bus cycles later, during bus clock cycle 5, the combination logic signals a BCI. In response to the BCI, all other devices attached to the bus determine whether they were driving the bus four clock cycles earlier, during bus clock cycle 1. If so, the bus device sets bit 1 of its fault isolation register. After all bus devices have had an opportunity to determine if they were the driving the bus during the clock cycle when the parity error occurred and set the appropriate bits of their respective fault isolation registers, a machine check will be signaled.

Figure 4A:
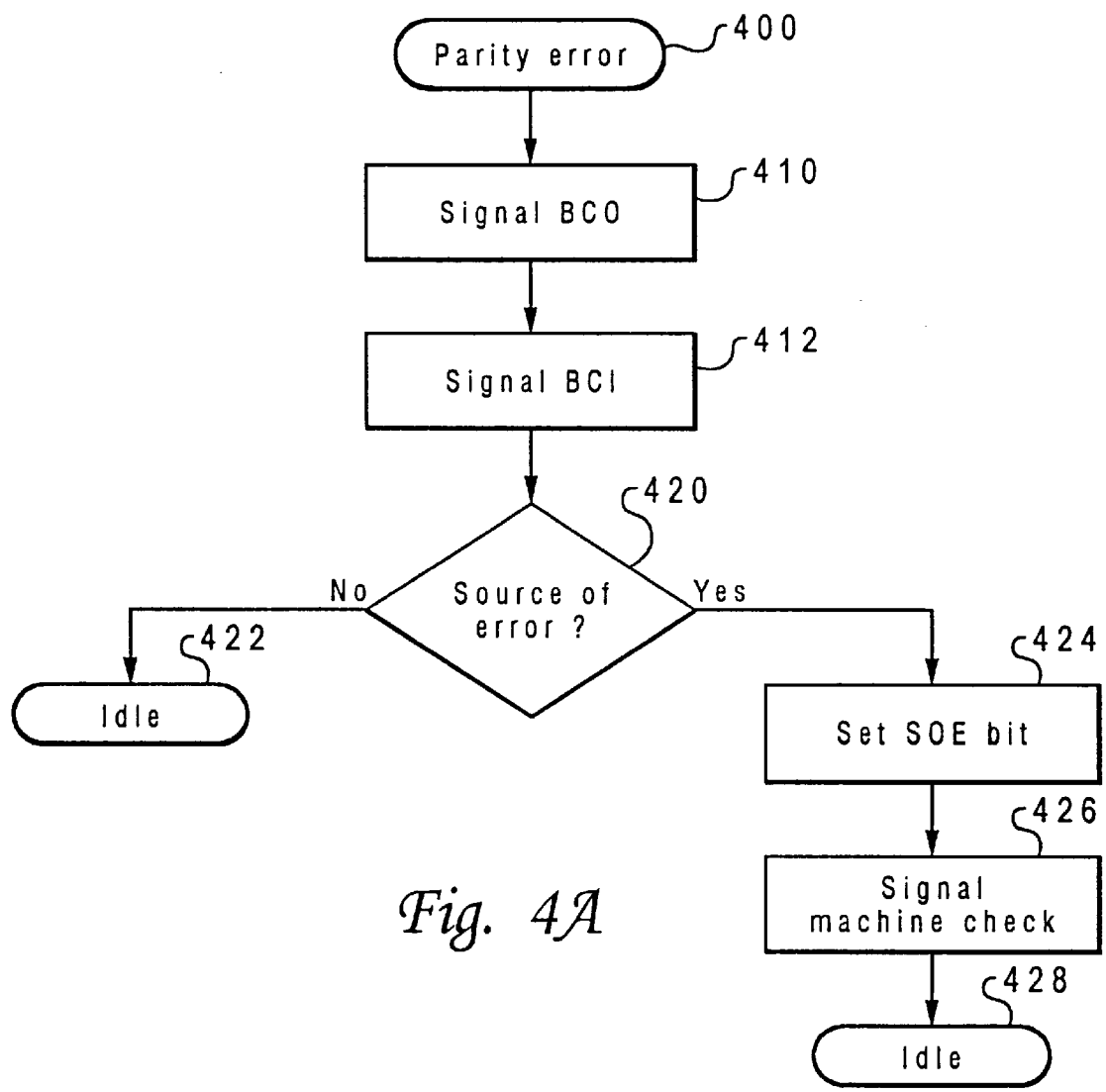
FIGS. 4A and 4B are high level flowcharts a process of error reporting and fault isolation in accordance with a preferred embodiment of the present invention.
Figure 4B:
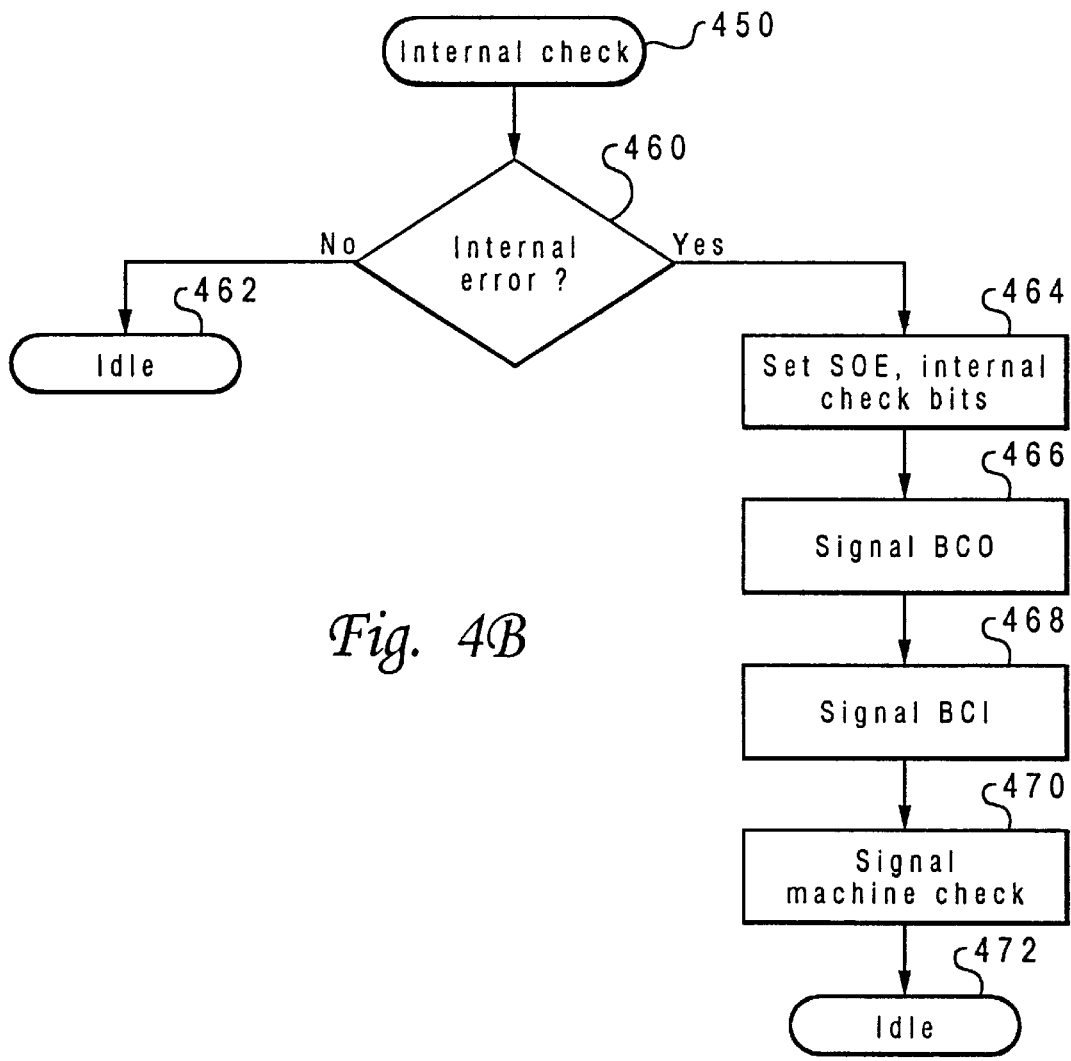

Referring to FIGS. 4A and 4B, high level flowcharts for a process of error reporting and fault isolation in accordance with a preferred embodiment of the present invention is illustrated. During operation of a data processing system, either a parity error on the governed bus or an internal error within a device connected to the governed bus may occur. FIG. 4A illustrates the response of the process to a parity error on the governed bus, while FIG. 4B illustrates the response of the process to an internal error within a device connected to the governed bus.

The process illustrated in FIG. 4A begins at step 400, which illustrates detection of a parity error. The process then passes to step 410, which depicts the bus participant detecting the parity error signaling a BCO during the next clock cycle to report the parity error, and then to step 412, which illustrates the combination logic signaling a BCI to all bus participants. The process next proceeds to step 420, which depicts each bus participants checking whether they were the source of error by determining if they were driving the governed bus during the clock cycle when the parity error occurred. If not, the process passes to step 422, which illustrates the process for those bus participants becoming idle until further involvement by the process is required.

If a bus participant determines that it was master of the governed bus when the parity error occurred, the process for that bus participant passes instead to step 424, which depicts the bus participant set the source of error (SOE) bit of its fault isolation register. The process then passes to step 426, which illustrates a machine check being signaled. The process then proceeds to step 428, which depicts the process becoming idle until further involvement by the process is required.

The process illustrated in FIG. 4B begins at step 450, which illustrates an internal check by a device connected to the governed bus. The process then passes to step 460, which depicts a determination of whether an internal error exists. If not, the process passes to step 462, which illustrates the process becoming idle until further involvement by the process is required. If an internal error is detected, however, the process passes instead to step 464, which illustrates the device detecting the internal error setting the source of error and internal check bits of its fault isolation register. The process then passes to step 466, which depicts the device detecting the internal error simultaneously signaling a BCO to report the error. The process next proceeds to step 468, which illustrates the combination logic signaling a BCI two clock cycles later, and then to step 470, which depicts a machine check being signaled. The process then proceeds to step 472, which illustrates the process becoming idle until further involvement by the process is required.

While the invention has been described in the context of a multiplexed address/data bus, a preferred embodiment of the present invention may easily be extended by adding an additional pair of signals to each bus unit for separate address and date buses and an additional bit in each respective fault isolation register to record address bus errors separately from data bus errors.

The method described above allows for error reporting and fault isolation in a bidirectional or multi-drop bus, where multiple devices connected to the governed bus may be the source of error. Upon detection of a parity error on the bus, each bus device determines whether it was master of the governed bus at the time the error occurs and reports the results of the determination in a fault isolation register (FIR) accessible to the machine check or service processor mechanism. Upon detection of an internal error within a bus device, the device records the existence and possible the details of the internal error in the fault isolation register and signals a bus check to report the error.

By having the individual bus participants determine if they were the source of error, complicated monitoring and reporting equipment is obviated in fault isolation. Furthermore, the method may be easily adapted for use in either a system or I/O bus, as well as in multiplexed or separate address/data lines. Logic may be added to lock the setting of the fault isolation register once set until it is read. This would allow capture of only the first occurring error and prevent multiple settings of the source of error bit by multiple errors. The machine check or service processor mechanism of a data processing system is thus provided with a valuable resource in identifying the cause of errors for system recovery or for system status reports.

While the invention has been particularly shown and described with reference to a preferred embodiment, it will be understood by those skilled in the art that various changes in form and detail may be made therein without departing from the spirit and scope of the invention.

What is claimed is:

1. A method of error reporting and isolation in a data processing system including a bus connected to a plurality of devices capable of driving the bus, comprising:

responsive to detecting a bus check request, signaling each of the plurality of devices to determine whether that device was driving the bus at the time of an error; and responsive to a determination that a device within the plurality of devices was driving the bus at the time of the error, storing a source of error indicator in a register associated with the device.

2. The method of claim 1 further comprising:

checking a parity for a bus transaction on the bus using at least one of the plurality of devices; and responsive to the at least one of the plurality of devices detecting an error in the parity, signaling a bus check signal to a unit connected to the bus.

3. The method of claim 2 wherein the step of signaling each one of the plurality of devices further comprises signaling each one of the plurality of devices using the unit connected to the bus.

4. The method of claim 1 further comprising:

conducting an internal check on at least one of the plurality of devices; and responsive to the at least one of the plurality of devices detecting an internal error, signaling a bus check signal to a unit connected to the bus.

5. The method of claim 4 wherein the step of signaling each one of the plurality of devices further comprises signaling each one of the plurality of devices using the unit connected to the bus.

6. The method of claim 4 further comprising storing an internal error indicator in the register on the device.

7. The method of claim 6 wherein the step of storing an internal error indicator further comprises storing the internal error indicator in a register on the device capable of being scanned by a machine check mechanism.

8. The method of claim 1 wherein the step of storing a source of error indicator further comprises storing the source of error indicator in a register on the device capable of being scanned by a service processor.

9. An apparatus for error reporting and isolation in a data processing system including a bus connected to a plurality of devices capable of driving the bus, comprising:

first signaling means, responsive to detecting a bus check request, for signaling each of the plurality of devices to determine whether that device was driving the bus at the time of an error; and storing means, responsive to a determination that the device within the plurality of devices was driving the bus at the time of the error, for storing a source of error indicator in a register associated with the device.

10. The apparatus of claim 9 further comprising:

parity checking means for checking a parity for a bus transaction on the bus using at least one of the plurality of devices; and second signaling means, responsive to the at least one of the plurality of devices detecting an error in the parity, for signaling a bus check signal to a unit connected to the bus.

11. The apparatus of claim 10 wherein the first signaling means comprises the unit connected to the bus.

12. The apparatus of claim 9 further comprising:

internal checking means for conducting an internal check on at least one of the plurality of devices; and second signaling means, responsive to the at least one of the plurality of devices detecting an internal error, for signaling a bus check signal to a unit connected to the bus.

13. The apparatus of claim 12 wherein the first signaling means comprises the unit connected to the bus.

14. The apparatus of claim 12 further comprising storing means for storing an internal error indicator in the register on the device.

15. The apparatus of claim 9 wherein the storing means further comprises a register on the device capable of being scanned by a machine check mechanism.

16. The apparatus of claim 9 wherein the storing means further comprises a register on the device capable of being scanned by a service processor.

17. A method of bus error reporting and isolation, comprising:

responsive to detecting a parity error on a bus, asserting a bus check request signal;

responsive to detecting, in a data storage device connected to the bus, assertion of the bus check request signal, determining whether the data storage device was driving the bus when the parity error occurred; and responsive to determining that the data storage device was driving the bus when the parity error occurred, setting an error source indicator corresponding to the data storage device in a register within a bridge governing the bus.

18. The method of claim 17, wherein the step of asserting a bus check request signal further comprises:

asserting the bus check request signal one cycle after detecting the parity error.

19. The method of claim 17, wherein the step of determining whether the data storage device was driving the bus when the parity error occurred further comprises:

determining whether the data storage device was driving the bus one cycle prior to detecting assertion of the bus check request signal.

20. The method of claim 17, wherein the step of determining whether the data storage device was driving the bus when the parity error occurred further comprises:

determining, in each of a plurality of data storage devices connected to the bus, whether a corresponding data storage device was driving the bus when the parity error occurred.

* * * * *